United States Patent
Richter

[19]

[11] Patent Number: 5,905,708
[45] Date of Patent: May 18, 1999

[54] FOCUSING TWO POLARIZED BEAMS ONTO DIFFERENT INFORMATION CARRIER LAYERS OF A SINGLE OPTICAL DISC

[75] Inventor: Hartmut Richter, Villingen-Schwenningen, Germany

[73] Assignee: Deutsche Thomson-Brandt GmbH, Villingen-Schwenningen, Germany

[21] Appl. No.: 08/953,943

[22] Filed: Oct. 20, 1997

[30] Foreign Application Priority Data

Oct. 21, 1996 [DE] Germany .................. 196 43 105

[51] Int. Cl.⁶ ........................................ G11B 7/12
[52] U.S. Cl. ................ 369/112; 369/44.37; 369/94
[58] Field of Search ................. 369/112, 94, 44.23, 369/44.37, 110, 109, 44.14, 118

[56] References Cited

U.S. PATENT DOCUMENTS

| | | | |
|---|---|---|---|
| 4,037,929 | 7/1977 | Bricot et al. | 369/112 |
| 4,124,273 | 11/1978 | Huignard et al. | 369/44.23 |
| 4,783,152 | 11/1988 | Nishimoto | 369/110 |
| 4,908,813 | 3/1990 | Ojima et al. | 369/94 |
| 5,093,822 | 3/1992 | Kugiya et al. | 369/121 |
| 5,251,198 | 10/1993 | Strickler | 369/94 |
| 5,278,816 | 1/1994 | Russell | 369/112 |
| 5,526,336 | 6/1996 | Park et al. | 369/112 |
| 5,659,533 | 8/1997 | Chen et al. | 369/112 |
| 5,671,207 | 9/1997 | Park | 369/112 |
| 5,734,637 | 3/1998 | Ootaki et al. | 369/112 |
| 5,761,176 | 6/1998 | Takahashi | 369/109 |

FOREIGN PATENT DOCUMENTS

| | | | |
|---|---|---|---|
| 2323160 | 4/1977 | France | G02B 3/14 |
| 2330027 | 5/1977 | France | G02F 1/29 |
| 196 43 105 | 2/1997 | Germany . | |
| 60-001633 | 1/1985 | Japan | G11B 7/14 |
| 62-042343 | 2/1987 | Japan | G11B 7/24 |
| 4-132032 | 5/1992 | Japan | G11B 11/10 |
| 8-249708 | 9/1996 | Japan | G11B 7/135 |
| 9-153228 | 6/1997 | Japan | G11B 7/135 |
| 9-259461 | 10/1997 | Japan | G11B 7/135 |
| WO92/03821 | 3/1992 | WIPO | G11B 13/04 |

*Primary Examiner*—Tod R. Swann
*Assistant Examiner*—Kim-Kwok Chu
*Attorney, Agent, or Firm*—Joseph S. Tripoli; Eric P. Herrmann; Ronald H. Kurdyla

[57] ABSTRACT

A device for reading from or writing to an optical recording medium is disclosed which has at least two information carrier layers spaced apart from one another, as well as a light source, an optical unit and a detection unit. The device permits a plurality of information carrier layers to be read from and/or written to simultaneously using light of a single wavelength. A partial beam generating element emits two polarized beams which differ in terms of polarization direction and propagation behaviour.

21 Claims, 3 Drawing Sheets

FOCUSING TWO POLARIZED BEAMS ONTO DIFFERENT INFORMATION CARRIER LAYERS OF A SINGLE OPTICAL DISC

BACKGROUND OF THE INVENTION

1. Field of the Invention

The present invention relates to a device for reading from and/or writing to an optical recording medium which has at least two information carrier layers spaced apart from one another, according to the preamble of claim 1.

2. Description of the Related Art

A device of this type is disclosed in U.S. Pat. No. 4,908,813. What is disadvantageous in the case of this known device is that the optical recording medium is provided with layers sensitive to different wavelengths, which consequently makes it necessary to provide the recording device with a plurality of lasers of different wavelength. Depending on the wavelength, these lasers are relatively complicated and cost-intensive.

SUMMARY OF THE INVENTION

The object of the present invention is to propose a device for reading from and/or writing to optical recording media having a plurality of information carrier layers spaced apart from one another which permits a plurality of information carrier layers to be read out and/or written to simultaneously using light of a single wavelength.

This object is achieved by means of the features specified in the characterizing part of claim 1. This has the advantage that simultaneous reading from or writing to or simultaneous reading from and writing to the optical recording medium is made possible using light of a single wavelength. The different propagation behaviour enables the two polarized beams to be focused onto two different information carrier layers by means of a simple optical unit; the different polarization enables simple separation of the polarized beams in the detection unit. The device according to the invention may be suitable both for reading from or writing to and for reading from and writing to an optical recording medium. The optical recording medium may be in the form of a disk, such as, for example, a CD or a DVD, but a recording medium in the form of a tape or a recording medium in another form with two information carrier layers lying one above the other and spaced apart from one another is also within the scope of the invention. The light source serves to generate a light beam used to read from or write to the optical recording medium. The said light beam is generally reflected from the optical recording medium, but the use of translucent recording media is likewise within the scope of the invention. The optical unit serves to focus the light beam generated by the light source onto the optical recording medium and to direct the reflected or transmitted light beam onto the detection unit. The latter serves to detect the light coming from the optical recording medium and to forward for example electrical signals, on the one hand for obtaining the information stored on the information carrier layer and on the other hand for obtaining parameters which are necessary or useful for the operation of the device, for example a tracking signal. The polarized beam generating element is advantageously a birefringent element which can be introduced into a convergent beam or into a divergent beam.

The invention provides for the polarized beam generating element to be a birefringent lens. This has the advantage that no additional element is required in the optical unit, since the latter contains lenses in any case. A further advantage may be seen in the fact that a lens composed of birefringent material separates an incident light beam into two polarized beams which, on the one hand, are polarized perpendicularly to one another and, on the other hand, are divergent or convergent to different extents, depending on the type of lens and its arrangement.

The invention provides for a polarization direction-rotating element to be arranged in the beam path upstream of the polarized beam generating element. This has the advantage that a variable distribution of the light intensity between the two polarized beams is achieved by rotating the polarization direction of the incident light. This is advantageous if it is necessary to match the intensities of the polarized beams to what may be different reflectivities of the information carrier layers. Moreover, the solution is advantageous when recording information items onto one of the information carrier layers. In this case, a higher light power is generally required for the polarized beam with which it is intended to effect recording, while the power of the other polarized beam, with which it is not intended to effect recording, may be very low. A further advantageous application of this inventive idea resides in the possibility of allocating 100% of the available light intensity to the respective polarized beam for the purpose of reading out either one or the other information carrier layer. This is practical for various applications, for example when it is intended to operate with a reduced power of the light source or for the purpose of achieving noise suppression by masking out the respective other information carrier layer, or in other suitable applications. All these different divisions of the intensity between the individual polarized beams make it possible to use a cost-effective light source of relatively low power, which, moreover, does not need to be variable in its power output. The polarization direction-rotating element is advantageously a rotatable pole filter. It may likewise be advantageous to arrange the light source, which is in particular a semiconductor laser, such that it is rotatable, or to rotate the polarization direction of the light, for example from a semiconductor laser, by means of a $\lambda/2$ plate, a Kerr cell or in another suitable manner.

According to another advantageous refinement of the present invention, the polarized beam generating element comprises an arrangement of two light sources which emit polarized light and are situated at different distances from the optical unit. This has the advantage that a birefringent polarized beam generating element is unnecessary. The light sources are preferably lasers, for example semiconductor laser diodes, which emit linearly polarized light. The light is coupled in, for example, by means of a semi-transparent mirror or a polarizing beam splitter.

These light sources are advantageously integrated on a single carrier element. This has the advantage that the carrier element is supplied in a manner adjusted to the assembly of the device, with the result that no adjustment is necessary during assembly of the device. It is particularly advantageous if the carrier element is an integrated semiconductor component. A device of this type can be produced such that it is already correctly adjusted.

According to the invention, the detection unit, that is to say the detection path of the device, has a birefringent prism-type beam splitter. This has the advantage of requiring less physical space, since the sensors for the two polarized beams can be arranged in one plane. A birefringent prism-type beam splitter has different path lengths for the various polarization directions and consequently makes it possible to transfer the focal points of the two polarized beams, which focal points are situated one behind the other in the optical axis of the propagation direction of the beam, into two focal points lying next to one another in a single focal plane perpendicular to the said optical axis.

The detection unit advantageously has a detector plane in which a plurality of detector elements are arranged. This has the advantage that the detector elements all lie in one plane and can therefore be produced cost-effectively as one component. Furthermore, it is not necessary to adjust the individual detector elements when they are being installed in the device.

The invention provides for the detection unit to have a polarization direction-dependent semi-transparent mirror. This has the advantage that the latter can be realized in a cost-effective and space-saving manner, for example as a polarizing beam splitter cube. It serves to divide the polarized beams coming from the optical recording medium between the various detector elements.

The present invention furthermore relates to an optical recording medium, in particular for use in a device according to the invention, which has the features specified in claim 9, namely that the optical recording medium has an information carrier layer having prerecorded information items as well as an information carrier layer which is spatially separate and spaced apart from the former layer, is suitable for recording information items and has no prerecorded information items. This has the advantage that the said prerecorded information items, which are necessary or at least useful for reading from and/or writing to the optical recording medium, do not have to be prerecorded twice, that is to say on each of the information carrier layers, since both information carrier layers can be read from and/or written to simultaneously by the corresponding device. This enables an increase in the memory space available for useful data recording, a reduction in the manufacturing costs of the optical recording medium, an increase in the signal-to-noise ratio and, in particular, enables the recorded information items on both information carrier layers to lie exactly one above the other, since the device, during the recording of both layers, in each case refers to the information items prerecorded in one layer. Useful data is a term encompassing video, audio and other useful data as well as pure data. The optical recording medium can, of course, also have a plurality of information carrier layers, at least one of which has prerecorded information items which are not prerecorded on the other layer or layers.

The present invention not only relates to the expressly mentioned exemplary embodiments and explanations, but also includes all configurations lying within the scope of the invention.

BRIEF DESCRIPTION OF THE DRAWINGS

Further advantageous features and refinements of the invention can be found in the following description with reference to the figures, in which.

DETAILED DESCRIPTION OF THE INVENTION

Figure 1:
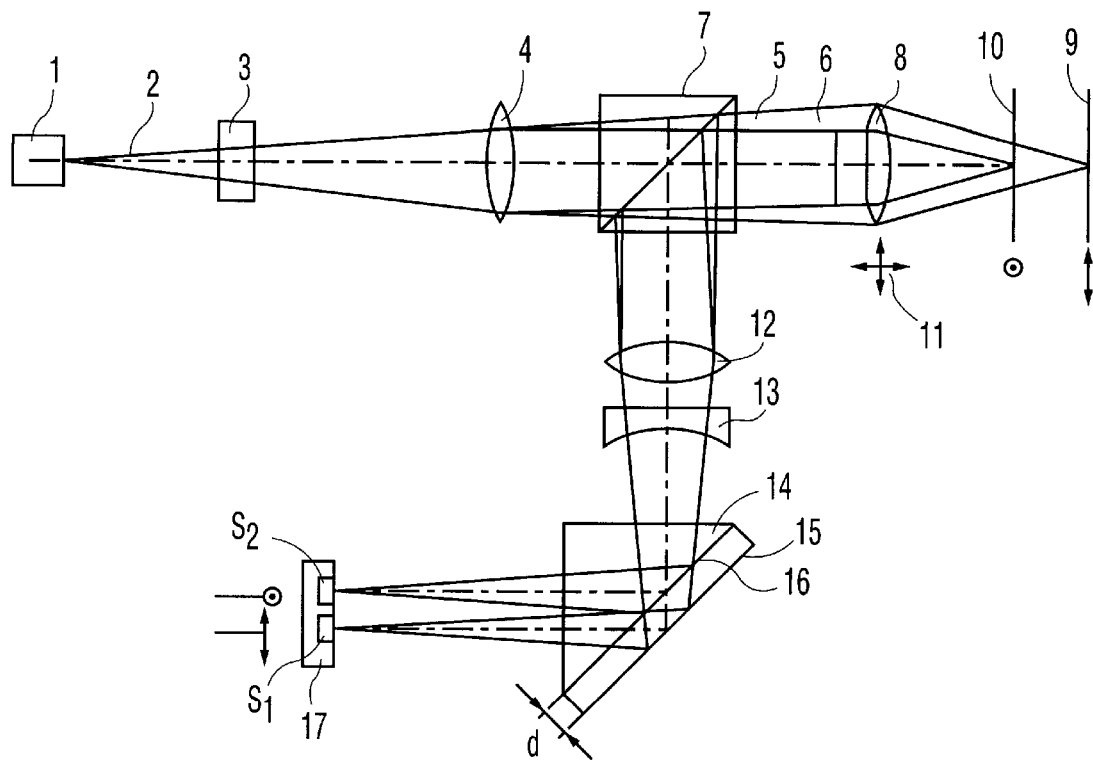
FIG. 1 shows a device according to the invention with a birefringent prism-type beam splitter.

FIG. 1 shows a device according to the invention with a birefringent prism-type beam splitter. A laser diode 1 which emits a linearly polarized light beam 2 serves as light source. This light beam passes through a phase grating 3, which produces +/− first-order secondary beam [sic] required for tracking according to the known three-beam method. This method is discussed only to the extent required to describe the exemplary embodiment. It goes without saying that the invention can also be advantageously used with other tracking methods. After passing through the phase grating 3, the light beam 2 falls onto a birefringent collimator lens 4, which represents the polarized beam generating element in the exemplary embodiment. The birefringent collimator lens 4 splits the light beam 2 into two polarized beams 5 and 6 which are polarized perpendicularly to one another. The polarized beams 5 and 6 pass through a non-polarizing beam splitter 7 and are focused by an objective lens 8 onto different information carrier layers 9 and 10 of the optical recording medium, which is indicated only diagrammatically here. For the purpose of focusing, the objective lens 8 can be displaced in the direction of the optical axis, in the left/right direction in FIG. 1. For the purpose of tracking along the tracks in which the information items are stored on the information carrier layers 9, 10, the objective lens 8 can be moved parallel to the information carrier layers 9, 10. This is done by a lens drive 11, which is indicated only diagrammatically here by means of double arrows in the respective direction of movement. In order to illustrate the polarization direction of the polarized beams 5 and 6, the polarization directions are represented symbolically on the information carrier layers 9 and 10. The polarized beam 5 incident on the information carrier layer 9 is, accordingly, polarized in the direction of the plane of the drawing, while the polarized beam 6 incident on the information carrier layer 10 is polarized perpendicularly with respect thereto. The polarized beams 5, 6 are reflected by the information carrier layers 9, 10, pass through the objective lens 8 and are deflected downwards in the FIG., in the non-polarizing beam splitter 7, and reach a focusing lens 12. They subsequently pass through a cylindrical lens 13, which is used to carry out the astigmatism autofocus method, which is not discussed here in any detail. They subsequently impinge on the polarizing prism-type beam splitter 14. The latter has two reflective layers 15 and 16, which each reflect light of one polarization direction. The polarized beam 5, which is polarized in the direction of the plane of the drawing, passes through the layer 16, which is reflective for the other polarization direction, and is reflected by the reflective layer 15 onto a sensor S1 of the detector arrangement 17. The polarized beam 6, which is polarized perpendicularly to the plane of the drawing, is reflected by the reflective layer 16 onto the sensor S2 of the detector arrangement 17.

According to the invention, the polarization of the light along the optical axis of the device is utilized to produce two mutually separate focal points on the information carrier layers 9 and 10. The focal points, which are separated in the longitudinal direction, are produced with the aid of the birefringent collimator lens 4. This facilitates, in the detection path, the separation of the signals originating from the different information carrier layers 9, 10, by using a polarization-sensitive optical arrangement, the polarizing prism-type beam splitter 14 in the exemplary embodiment. According to the invention, it is likewise possible to design the objective lens 8 as a birefringent lens. In this case, the separation in the detection path cannot be realized as easily as in the manner illustrated in FIG. 1. A recommended birefringent material for the collimator lens 4 is quartz, for example, whose refractive indices $n_e=1.5533$ and $n_o=1.5442$ at a wavelength of about $\lambda \approx 700$ nm, the wavelength region usually used for corresponding devices, enables [sic] focal point separation which is sufficient for the usual dimensions of the write/read head.

The reflective layers 15, 16 of the polarizing prism-type beam splitter 14 are arranged parallel to one another at a distance d. By suitable selection of the distance d, an optical path length is inserted which enables the two focal points, which impinge on the information carrier layers 9 and 10 spaced apart from one another, to be imaged on the detector arrangement 17 in one plane. Assuming that the focal length of the focusing lens 12 is 42 mm and that of the objective lens 8 is 3.5 mm, the resulting magnification factor is $\eta=12$, which, assuming that the distance between the information carrier layers 9, 10 is $\delta=70$ nm, results in a required thickness d of $$d = \frac{\eta * \delta}{2\sqrt{2}} \approx 0.3 \text{mm}$$

Figure 2:
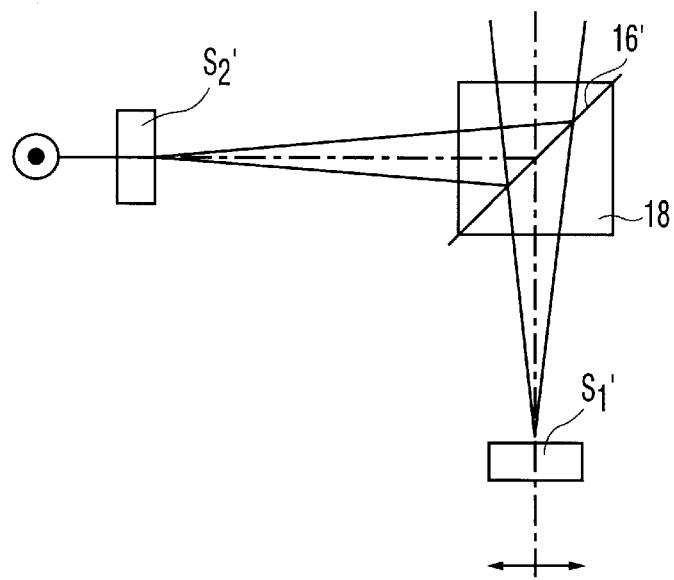
FIGS. 2 shows the detection path of a device according to the invention with a polarization direction-dependent semi-transparent mirror.

FIG. 2 illustrates the detection path of a device according to the invention, that is to say the region of FIG. 1 which is represented below the cylindrical lens 13. After passing through the cylindrical lens 13, the polarized beams 5 and 6 coming from the optical recording medium impinge on a polarizing beam splitter cube 18, which has a reflective layer 16'. The polarized beam 5, which is polarized in the plane of the drawing, passes through this reflective layer 16' and impinges on a sensor S1'. The polarized beam 6, which is polarized perpendicularly with respect thereto, is reflected by the reflective layer 16 and directed onto the sensor S2'. The two sensors S1' and S2' are adjusted with respect to one another in the detection unit. In this exemplary embodiment, it is possible to dispense with a polarizing prism-type beam splitter having reflective layers arranged at a distance d.

Figure 3:
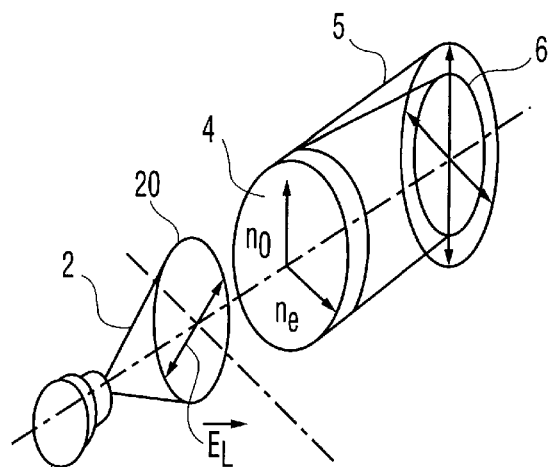
FIG. 3 shows part of a device according to the invention with a polarization direction-rotating element in a three-dimensional illustration.

FIG. 3 shows part of a device according to the invention with a polarization direction-rotating element 20 in a three-dimensional illustration. The laser diode 1 and the light beam 2 emitted by it can be discerned. The polarization direction is specified by the indication of the polarization vector $E_L$ of the polarization direction-rotating element 20. In the birefringent collimator lens 4, the polarization direction for the ordinary beam is indicated by $n_o$ and the polarization direction for the extraordinary beam is indicated by $n_e$. The corresponding polarized beams 5 and 6 are indicated in the further beam path. In the illustration represented, the polarization vector $E_L$ is shown having been rotated through 45° with respect to the preferred directions of the birefringent collimator lens 4 which are indicated by the arrows $n_o$ and $n_e$. By rotating the polarization $E_L$ of the light beam 2 with respect to the crystal axes $n_o$ and $n_e$ of the collimator lens 4, the intensity of the two collimated, polarized polarized beams 5, 6 can be adjusted in a continuously variable manner. The two intensities have the same magnitude at an angle of 45°. Particularly for writing to a writable information carrier layer 9 and/or 10, it is practical to increase the intensity of the polarized beam 5 and/or 6 used for writing in comparison with the respective other polarized beams 6 and/or 5, for example in the ratio 80:20.

Figure 4:
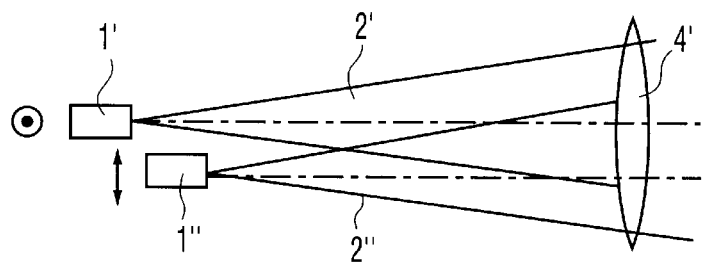
FIG. 4 shows part of a device according to the invention with two light sources in a first embodiment.

FIG. 4 shows part of a device according to the invention with two light sources in a first embodiment. Two separate laser diodes 1' and 1", which have a small lateral offset as well as an offset in the longitudinal direction, that is to say in the beam propagation direction, are provided in this case. This is illustrated in a greatly exaggerated manner in FIG. 4. Furthermore, the laser diodes 1' and 1", are aligned in such a way that the light beams 2' and 2" generated by them are polarized perpendicularly to one another. A conventional collimator lens 4' is used in this case. The further beam path corresponds to that described in relation to FIG. 1 and in relation to FIG. 2. With a suitable lateral offset, it may be possible to achieve greater splitting of the polarized beams in the region of the detector arrangement 17, with the result that it is possible to provide a less elaborate solution in this case.

Figure 5:
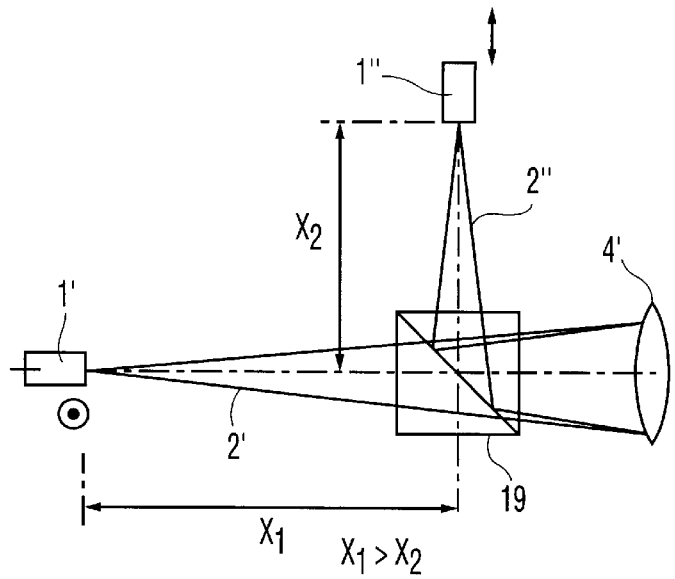
FIG. 5 shows part of a device according to the invention with two light sources in a second embodiment.

FIG. 5 represents a second embodiment of a device according to the invention with two light sources. In this case, too, use is made of two separate laser diodes 1', 1", whose light beams 2', 2" are combined by means of a semi-transparent reflective film 19 and are directed onto a conventional collimator lens 4'. The distance $x_1$ between the laser diode 1' and the semi-transparent reflective film 19 and the distance $x_2$ between the laser diode 1" and the semi-transparent reflective film 19 are selected to be different, thereby producing longitudinally displaced focal points for the two light beams 2' and 2", corresponding to the distance between the information carrier layers 9 and 10. The advantage of this embodiment over that described in FIG. 4 resides in the fact that the light beams 2' and 2" are not laterally offset with respect to one another, since both laser diodes 1' and 1" can be arranged exactly in the optical axis. In this case, too, the further beam path corresponds to that described in relation to FIG. 1 and FIG. 2.

Figure 6:
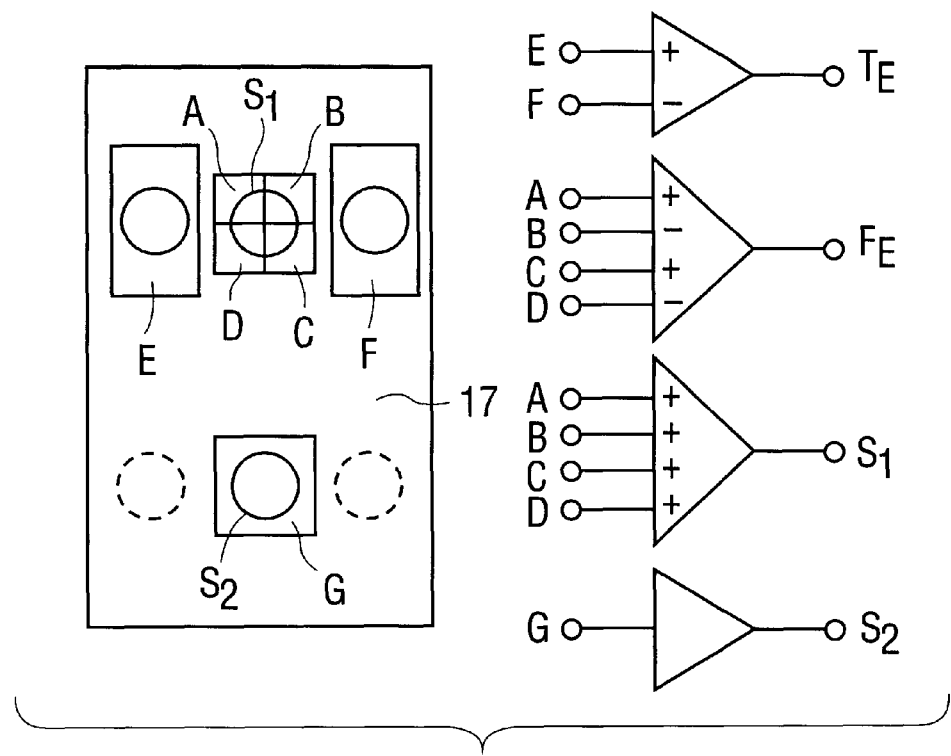
FIG. 6 shows a detector unit of a device according to the invention.

FIG. 6 represents the detector arrangement 17 of a device according to the invention. The sensors $S_1$ and $S_2$ on which polarized beams 5 and 6, respectively, are imaged can be discerned. In the exemplary embodiment, the sensor $S_1$ is divided into four quadrants consisting of the detector elements A, B, C, D. This division makes it possible to form a focusing signal FE in accordance with the astigmatism focus method. This is illustrated in the right-hand part of FIG. 6. FE results from the difference between the respective sum of two diagonally arranged detector elements: FE=(A+C)−(B+D). Further detector elements E and F serve to obtain a tracking signal TE in accordance with the three-beam method. The light beam 2 is split by the phase grating 3 into a zeroth-order primary beam and two +/− first-order secondary beams, which is not illustrated in the previous FIGS. for the sake of simplicity. In FIG. 6, the light spots originating from these beams are indicated in each case as a circular spot on the detector elements. The zeroth-order primary beam falls onto the central area of the sensor $S_1$ and of the sensor $S_2$, while the +/− first-order secondary beams of the polarized beam 5 fall onto the detector elements E and F. Since no detector elements are provided for the +/− first-order secondary beams of the polarized beam 6, the corresponding light spots are indicated by dashed lines. The tracking signal TE results from the difference between the signals emitted by the detector elements E and F. The polarized beam 6 falls onto the sensor S2, which consists of a single detector element G. The information signal of the polarized beam 6 consequently corresponds to the output signal of the detector element G, and the information signal of the polarized beam 5 corresponds to the sum of the output signals of the detector elements A to D. This is likewise indicated in the right-part of FIG. 6. The imaging, described here, of the two focal points, that on the information carrier layer 9 and that on the information carrier layer 10, onto a single detector arrangement 17 is possible due to the use of the polarizing prism-type beam splitter 14. It goes without saying that corresponding detector elements to those in the region of the sensor 1 can also be arranged in the region of the sensor 2, if appropriate, in order to improve focusing and tracking. Furthermore, it is possible to use other focusing and tracking methods, the detector arrangement 17 having to be constructed in accordance with these methods.

Figure 7:
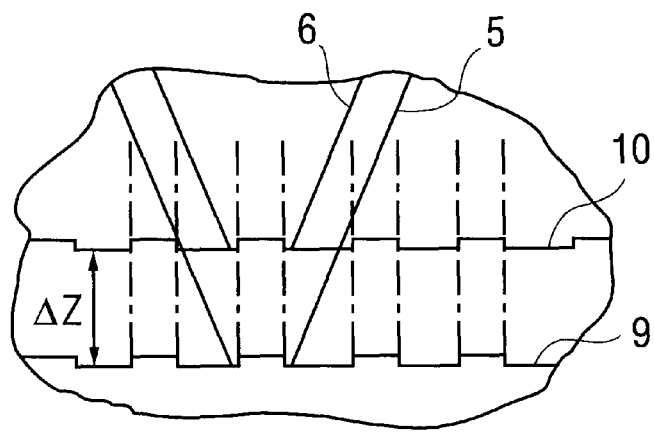
FIG. 7 shows a detail of an optical recording medium according to the invention.

FIG. 7 illustrates a detail of an optical recording medium according to the invention in the region of the information carrier layers 9 and 10. The arrangement of two information carrier layers makes it possible to accommodate about double the volume of data on the optical recording medium. A further increase in the storage capacity is produced if further information carrier layers are arranged correspondingly. With the multiple-focus optical arrangement according to the invention, two of these information carrier layers can be read out simultaneously, since the distance between the focal points of the polarized beams 5 and 6 corresponds ΔZ to the distance [sic] between the two information carrier layers 9 and 10. The information tracks of the information carrier layers 9 and 10 in this case lie one above the other, with the result that not only are both polarized beams 5 and 6 focused simultaneously on a respective information carrier layer, but they can also simultaneously read usable information items there. The information carrier layer 10 is semi-transparently reflective, with the result that the polarized beam 5 can pass through it. An interesting application of the present invention is when the optical recording medium is a so-called ROM/RAM disk. In this case, for example, the information carrier layer 9 is a ROM layer. That is to say it contains only read information items in a pre-embossed information track. The information carrier layer 10 is designed as a storage layer. This may be a phase change layer, a photorefractive layer, a magneto-optical layer or any other layer suitable for recording. However, the information carrier layer 10 is constructed without a leader track which is usually present in the case of recording layers. An optical recording medium of this type is read from and written to using a double-focus system, i.e. the device according to the invention as explained above, for example. This has the advantage that the information track and/or a leader track of the information carrier layer 9 can be used for focusing, tracking, disk control and the addressing of the areas of the information carrier layers 9, 10. During the writing operation in the information carrier layer 10, a data track is automatically written in exactly above the track of the information carrier layer 9. Since the information carrier layer is a planar, uniform area without a leader track or additional addressing information items, the signal-to-noise ratio that can be achieved is higher, since an additional noise signal due to any roughness of the edges of a leader track or from addressing bits are [sic] not produced. Moreover, the entire storage capacity of the information carrier layer can be utilized for data storage, since it is not necessary for any address or servo information items, such as, for example, for tracking, to be located on the information carrier layer 10. Using the method, described in relation to FIG. 3, for rotating the polarization direction with respect to the crystal axis of the birefringent collimator lens 4, it is possible correspondingly to adjust the light intensity for writing on the information carrier layer 10. For example, the intensity of the polarized beam 5 reading on the information carrier layer 9 may be about 10% of the total power of the laser diode 1, and the intensity of the polarized beam 6 used for writing on the information carrier layer 10 may accordingly be about 90% of the said power.

What is claimed is:

1. Device for reading from or writing to an optical recording medium which has at least a first and a second information carrier layers said first and second layer being spaced apart from one another, the device having a light source, an optical unit and a detection unit, wherein a polarized beam generating element is present, which emits a first and a second polarized beams which differ in terms of polarization direction and propagation behaviour, thus having a focal point of the first polarized beam on one of said layers and a focal point of the second polarized beam on another of said layers simultaneously to provide simultaneous access to said first and said second information carrier layers.

2. Device according to claim 1, characterized in that the polarized beam generating element is a birefringent lens.

3. Device according to claim 2, characterized in that a variable polarization direction-rotating element is arranged in the beam path upstream of the polarized beam generating element.

4. Device according to claim 2, characterized in that the detection unit has a birefringent prism-type beam splitter.

5. Device according to claim 2, characterized in that the detection unit has a polarization direction-dependent semi-transparent mirror.

6. Device according to claim 2, characterized in that said birefringent lens is a collimator lens.

7. Device according to claim 1, characterized in that the detection unit has a first sensor upon which said first polarized beam is incident after having been reflected by said first layer and a second sensor upon which said second polarized beam is incident after having been reflected by said second layer.

8. Device according to claim 1, characterized in that the detection unit has a polarization direction-dependent semi-transparent mirror.

9. Device according to claim 1, characterized in that the detection unit has a birefringent prism-type beam splitter.

10. Device according to claim 9, characterized in that the detection unit has a detector arrangement, in which a plurality of detector elements are arranged in one plane.

11. Device according to claim 1 characterized in that a variable polarization direction-rotating element is arranged in the beam path upstream of the polarized beam generating element.

12. Device according to claim 11, characterized in that the detection unit has a birefringent prism-type beam splitter.

13. Device according to claim 11, characterized in that the detection unit has a polarization direction-dependent semi-transparent mirror.

14. Device according to claim 1, characterized in that the polarized beam generating element is an arrangement of two light sources which emit polarized light and are at different distances from the optical unit.

15. Device according to claim 4, characterized in that the light sources are integrated on a single carrier element.

16. Device according to claim 15, characterized in that the detection unit has a birefringent prism-type beam splitter.

17. Device according to claim 15, characterized in that the detection unit has a polarization direction-dependent semi-transparent mirror.

18. Device according to claim 14, characterized in that the detection unit has a birefringent prism-type beam splitter.

19. Device according to claim 14, characterized in that the detection unit has a polarization direction-dependent semi-transparent mirror.

20. Optical recording medium for use in a device for simultaneously reading from or writing to different information carrier layers of an optical recording medium wherein the optical recording medium has first information carrier layer having prerecorded information items, and a second information carrier layer which is spatially separate and spaced apart from said first layer, said second layer being suitable for recording information items and being free of corresponding prerecorded information items.

21. Optical recording medium according to claim 20, characterized in that said first information carrier layer is a read-only layer and that said second information carrier layer is a random access layer.

* * * * *